E. G. DAVISON.
AUTOMOBILE BUMPER.
APPLICATION FILED SEPT. 20, 1920.
1,396,026.
Patented Nov. 8, 1921.
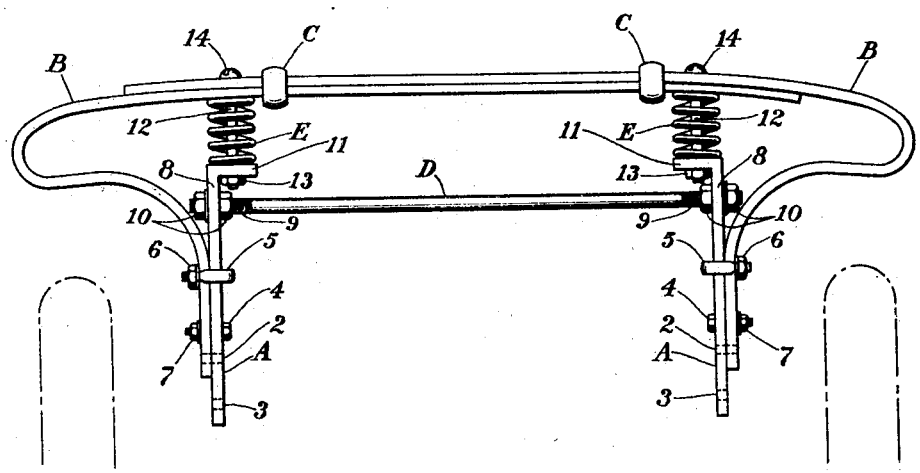
INVENTOR
E. G. DAVISON,
BY
Richey Slough + Tales
ATTORNEYS.

UNITED STATES PATENT OFFICE.

ERNEST G. DAVISON, OF ELYRIA, OHIO, ASSIGNOR OF ONE-HALF TO JOSEPH H. BROWN, OF ELYRIA, OHIO.

AUTOMOBILE-BUMPER.

1,396,026.   Specification of Letters Patent.   Patented Nov. 8, 1921.

Application filed September 20, 1920. Serial No. 411,637.

*To all whom it may concern:*

Be it known that I, ERNEST G. DAVISON, a citizen of the United States, residing at Elyria, in the county of Lorain and State of Ohio, have invented a certain new and useful Improvement in Automobile-Bumpers, of which the following is a full, clear, concise, and exact description, such as will enable others skilled in the art to which this invention appertains to make and use the same.

My invention relates to improvements in automobile bumpers and has for one object, the provision of a novel, improved form of yielding, flexible bumper, which may be easily and conveniently mounted on the front or rear end of the motor vehicle, and will thereby be protected against contact with other bodies.

Another object is to provide a form of bumper which will be simple of construction, convenient to install, inexpensive to manufacture and durable in use. It is an object of my invention to provide a bumper, which, while having the necessary yielding qualities to shocks from the various directions, will yet be sufficiently strong to yieldingly withstand these shocks without dis-arranging the parts of the bumper, and at the same time, to provide a structure which will not be unduly vibrated when the vehicle is being driven over rough roads, so as to cause the parts thereof to loosen up and to rattle or come apart.

Other objects of my invention and the invention itself, will be better understood by reference to the accompanying drawing, which shows a plan view of the embodiment of my invention.

In the drawing, I have illustrated a motor-car bumper, but have not shown it mounted on a motor vehicle, because clearly it might be adapted to any kind of motor vehicle, in many ways, and the novelty of my invention does not consist in the vehicle itself.

Referring to the drawing, at A, I show a pair of heavy iron bars preferably of rectangular cross section, each perforated at 2 and 3 for the passage of bolts whereby the bumper may be attached to a motor vehicle. The members A are also perforated at 4 and 5 for the passage of bolts 6 and 7 securely clamped to each of the bars A, an impact bumper element B, these bumper elements being of the shape shown in the drawing and having their forward ends superposed and fastened together by clamps C. The supporting bars A are also perforated at 8 for the passage of a rod D which is threaded at each end, as shown at 9, the threaded portions passing through the members A, to which the rod D is secured by a pair of clamping nuts 10.

At each end of the rod, both of the bars are similarly secured to the interconnecting rod D by a nut 10 on each side of the bar A, carried on the threads 9 of the bar D. Each of the bars A are bent at right angles at its forward end 11, and each forward end is perforated and threaded for the passage and securing of a bolt 12, which is clamped on the member 11 by a clamping nut 13. The other ends of the bolts 12 pass through the bumper element B, the heads of the bolts 12 being positioned as shown at 14, to restrain the outward movement of the bumper element B. A heavy coiled spring E is carried on the ends of the bars A and about the bolts 12 and between the bent front ends of bars A, and the bumper element B exerting a constraining spring pressure between each of the bars A and the adjacent points of the bumper elements, this pressure being withstood by the holding action of the bolts 12.

The bumper elements B are preferably of the form shown in the drawing, although obviously they can depart therefrom somewhat.

It will be evident also that while I have shown in the embodiment illustrated, an operative device having the different parts of specific shape and arrangement, still many changes might be made both in size, shape and arrangement of parts, without departing materially from the spirit of my invention, and I do not wish to be limited to the embodiment illustrated, but the scope of my invention is described in the following claims:—

1. In a bumper, a pair of supporting bars, means to secure the said bars to the vehicle, the free end of the bars having an abutment in a plane substantially at right angles to the direction of the length of the bars, an interconnecting tie-rod between the said bars and affixed thereto near the said abutments, an outer guard bumper element secured at either end to one of the said bars; said bumper element consisting of a pair of flat spring elements, both of the said elements being clamped together near their forward ends, and a coiled spring resting on each abutment and between the said abutments and adjacent portions of the said flat spring bumper element.

2. In a bumper, a bumper contact element adapted to extend across the front of a vehicle, said element comprising a pair of flat springs, each of the said flat springs having a U-shaped portion, said U-shaped portions containing an outer and an inner arm, means to clamp the said flat springs together in superposed relation, a pair of coiled springs secured between the arms of the U-shaped portions of the flat spring elements, an interconnecting tie-rod between the outer arm of the two spring element U-shaped portions adapted to secure the said arms together, and rigid connections between the said coil springs and the said arms, and means to secure the assembled bumper to a vehicle, said means including said rigid connections.

3. In a bumper, a flattened U-shaped contact element of spring material, a pair of relatively rigid supporting bars, said contact element being secured at each end to a supporting bar, an abutment for each of the said bars, spring members resting on the said abutments and compressed between the said abutments and an adjacent portion of the said contact element, means to maintain the coiled spring elements in position, a tie-rod between the said supporting bars and securely fastening the free ends of the said bars adjacent the said abutments together.

4. In a bumper, a pair of rigid supporting members, each of the said members being adapted to be secured to a motor vehicle at one side of the frame thereof, each of the said bars extending therefrom, each being parallel to the other, an impact element for the said bumper secured at its free ends to the said supporting bars, the said ends running parallel with the said bars and being clamped securely thereto at several points along the said bars, an abutment on the end of each of the said bars, and a spring member maintained particularly compressed in position on the said abutments and between the said abutments and adjacent portions of the said contact element.

In witness whereof I have hereunto signed my name this 15th day of September, 1920.

ERNEST G. DAVISON.